(12) United States Patent
Cho et al.

(10) Patent No.: US 10,457,306 B2
(45) Date of Patent: Oct. 29, 2019

(54) SERVER, SYSTEM, AND METHOD FOR AUTOMATICALLY CALCULATING PLATFORM DWELL TIME OF TRAIN

(71) Applicant: KOREA RAILROAD RESEARCH INSTITUTE, Gyeonggi-do (KR)

(72) Inventors: Bong Kwan Cho, Seoul (KR); Kee Jun Park, Gyeonggi-Do (KR)

(73) Assignee: KOREA RAILROAD RESEARCH INSTITUTE, Gyeonggi-do (KR)

( * ) Notice: Subject to any disclaimer, the term of this patent is extended or adjusted under 35 U.S.C. 154(b) by 85 days.

(21) Appl. No.: 15/527,709

(22) PCT Filed: Dec. 22, 2015

(86) PCT No.: PCT/KR2015/014063
§ 371 (c)(1),
(2) Date: May 18, 2017

(87) PCT Pub. No.: WO2016/171370
PCT Pub. Date: Oct. 27, 2016

(65) Prior Publication Data
US 2018/0354535 A1 Dec. 13, 2018

(30) Foreign Application Priority Data
Apr. 22, 2015 (KR) .................. 10-2015-0056296

(51) Int. Cl.
*B61L 27/04* (2006.01)
*B61B 1/02* (2006.01)
(Continued)

(52) U.S. Cl.
CPC ................ *B61L 27/04* (2013.01); *B61B 1/00* (2013.01); *B61B 1/02* (2013.01); *B61L 23/041* (2013.01);
(Continued)

(58) Field of Classification Search
CPC ..... B61L 27/04; B61L 25/02; G06K 9/00778; G06K 9/00255; B61B 1/00; B61B 1/02; H04N 5/247
See application file for complete search history.

(56) References Cited

U.S. PATENT DOCUMENTS 4,361,300 A * 11/1982 Rush .................. B61L 27/0016
246/187 C
5,364,047 A * 11/1994 Petit ........................ B61L 3/008
246/122 R
(Continued)

FOREIGN PATENT DOCUMENTS

JP 2010-228688 10/2010
JP 2014-054899 3/2014
(Continued)

OTHER PUBLICATIONS

"International Search Report (Form PCT/ISA/210)", dated Mar. 29, 2016, with English translation thereof, pp. 1-4.

*Primary Examiner* — Russell Frejd
(74) *Attorney, Agent, or Firm* — JCIPRNET

(57) ABSTRACT

The present invention relates to a system, server, and method for automatically calculating a platform dwell time of a train. The system includes a passenger detection device configured to determine the number of passengers who board or deboard a train entering a station; an operation control server configured to calculate an appropriate dwell time of the train by using the number of passengers, which is received from the passenger detection device; and an ATO device configured to control a dwell time of the train by using the appropriate dwell time, which is received from the operation control server.

9 Claims, 10 Drawing Sheets

(51) Int. Cl.
  *B61B 1/00*     (2006.01)
  *G06K 9/00*     (2006.01)
  *B61L 23/04*    (2006.01)
  *B61L 27/00*    (2006.01)
  *B61L 25/02*    (2006.01)
  *H04N 5/247*    (2006.01)

(52) U.S. Cl.
  CPC ...... *B61L 27/0088* (2013.01); *G06K 9/00255* (2013.01); *G06K 9/00778* (2013.01); *G06K 9/00832* (2013.01); *B61L 25/02* (2013.01); *H04N 5/247* (2013.01)

(56) References Cited

U.S. PATENT DOCUMENTS

| | | | |
|---|---|---|---|
| 6,741,175 B1* | 5/2004 | Rauch | B61B 1/02 340/541 |
| 6,876,907 B2* | 4/2005 | Kanner | B61L 27/0094 246/169 R |
| 9,446,766 B2 | 9/2016 | Tanaka et al. | |
| 2004/0059442 A1* | 3/2004 | Birkelbach | G05B 17/02 700/30 |
| 2005/0027410 A1* | 2/2005 | Kanner | B61L 27/0094 701/19 |
| 2013/0344802 A1* | 12/2013 | Armour | H04W 84/005 455/39 |
| 2015/0066558 A1* | 3/2015 | Kimiagar | G06Q 10/06313 705/7.17 |
| 2015/0360706 A1 | 12/2015 | Niinomi et al. | |

FOREIGN PATENT DOCUMENTS

| | | |
|---|---|---|
| JP | 2014-144754 | 8/2014 |
| JP | 2014-233989 | 12/2014 |
| KR | 10-1011950 | 1/2011 |

* cited by examiner

[FIG. 1]
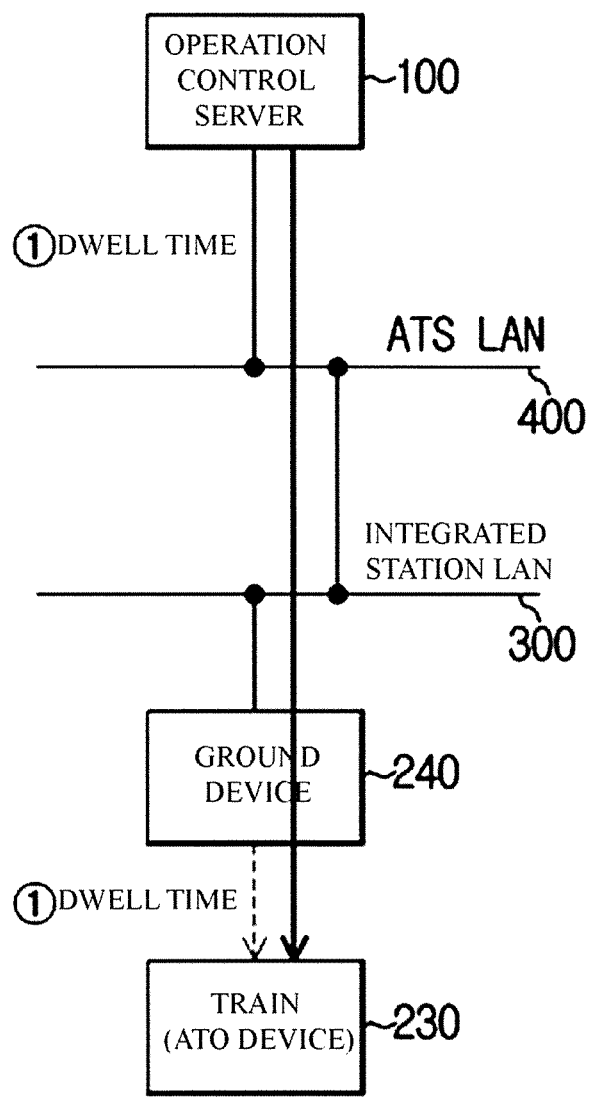

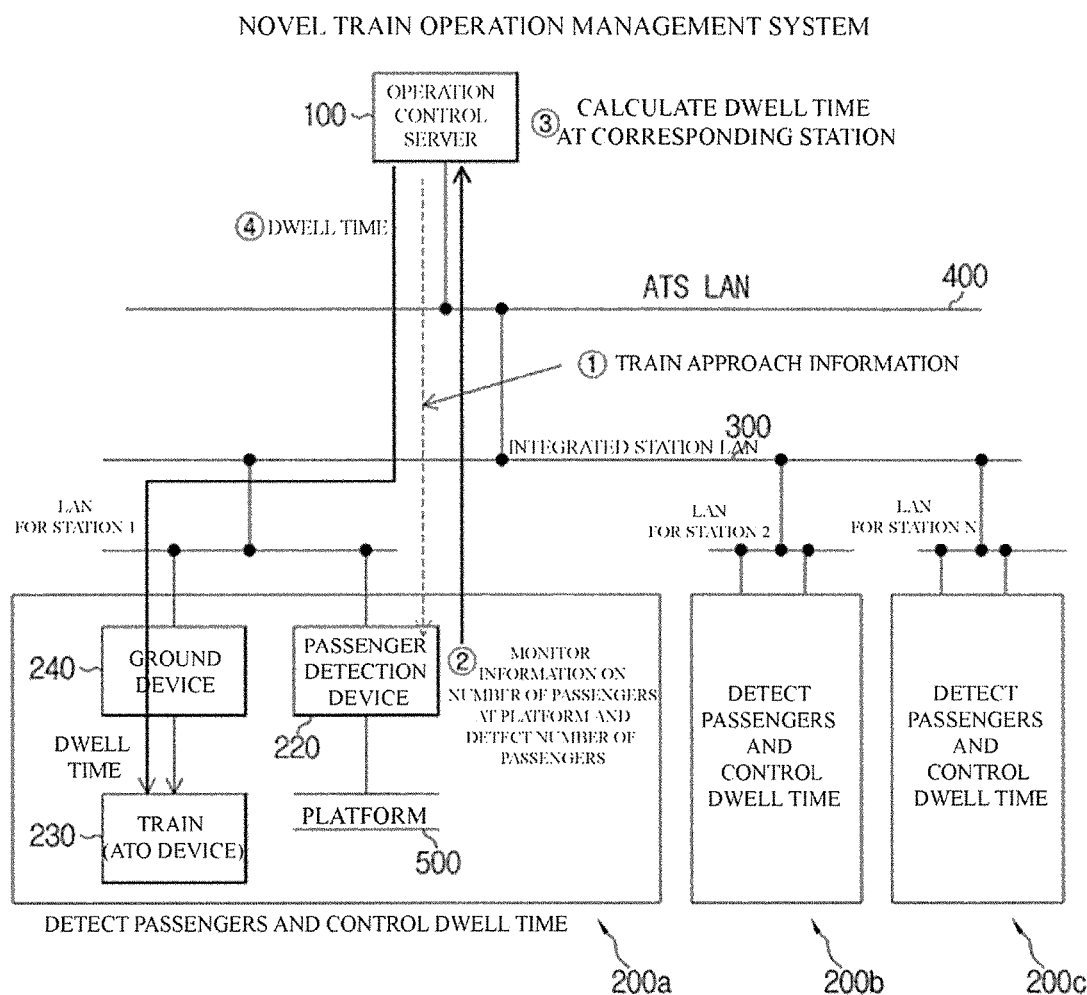

[FIG. 3A]
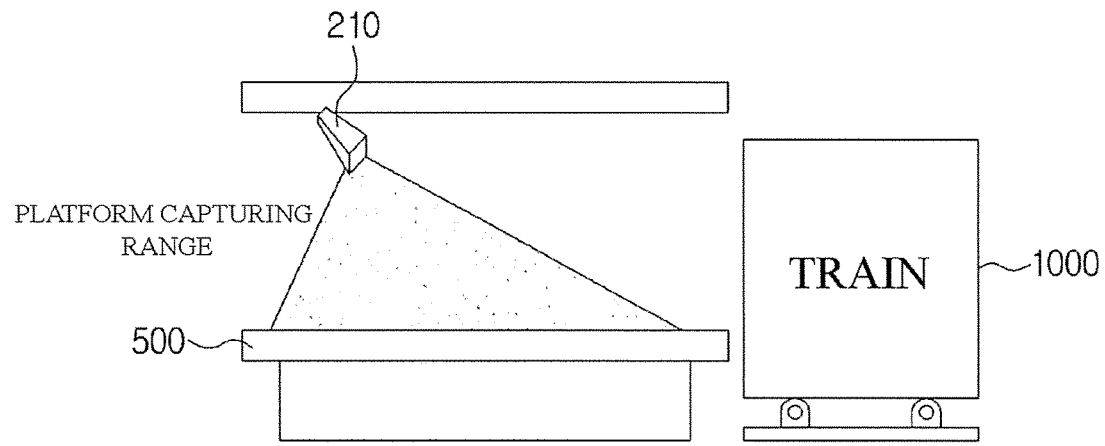
[FIG. 3B]
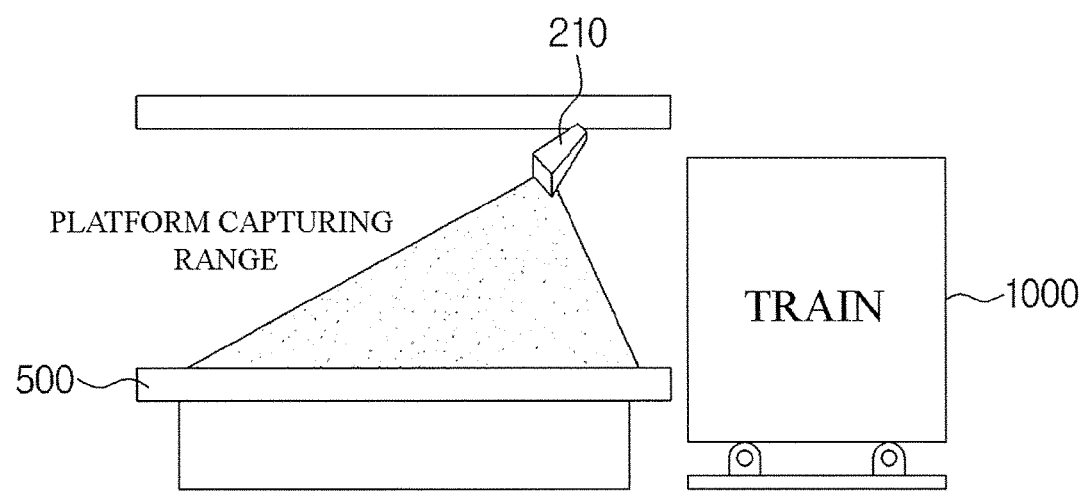

[FIG. 3C]
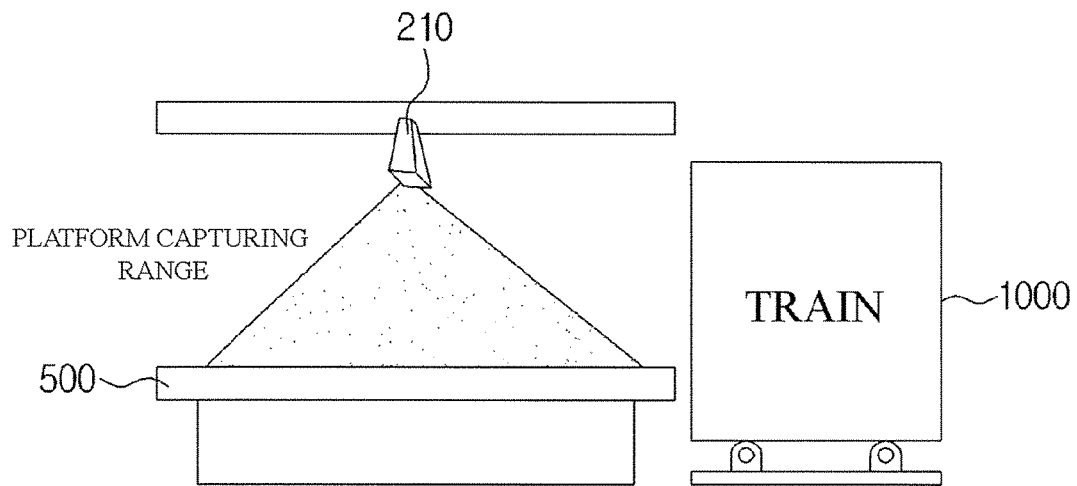
[FIG. 3D]
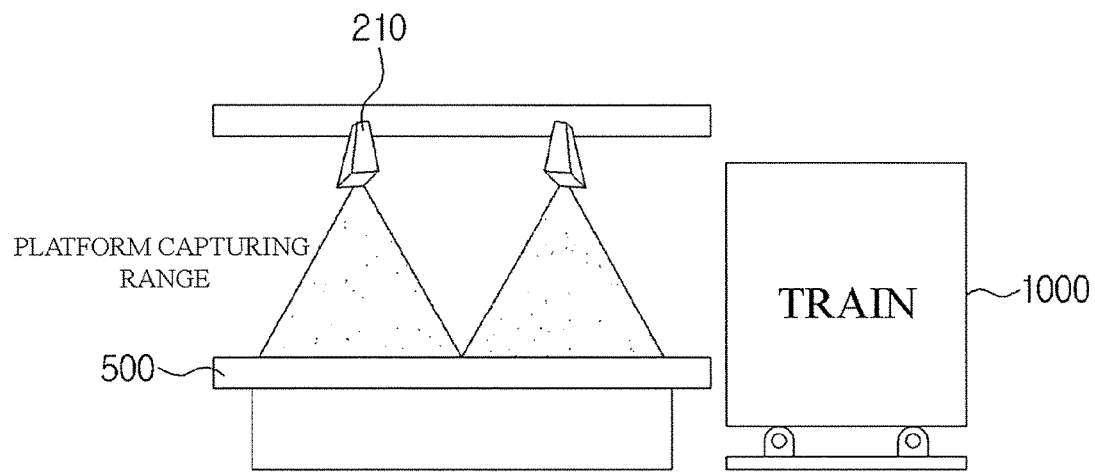

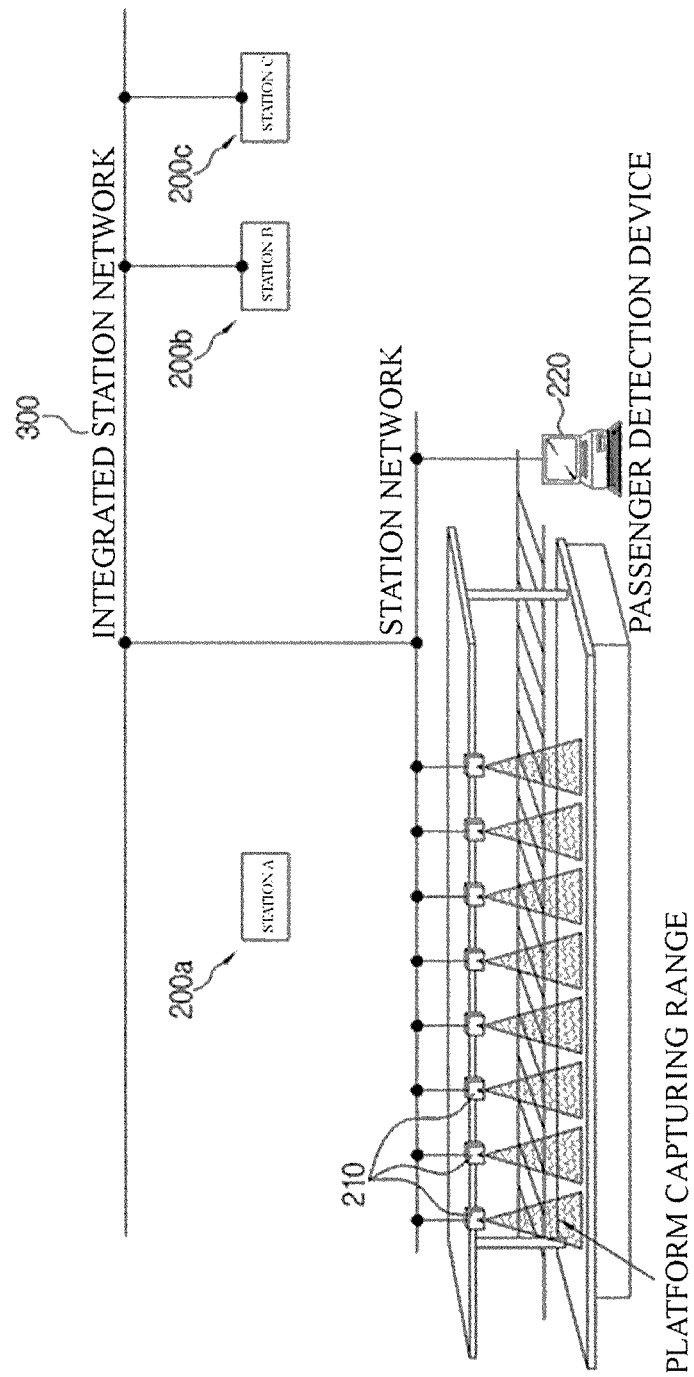
[FIG. 4]

[FIG. 5]
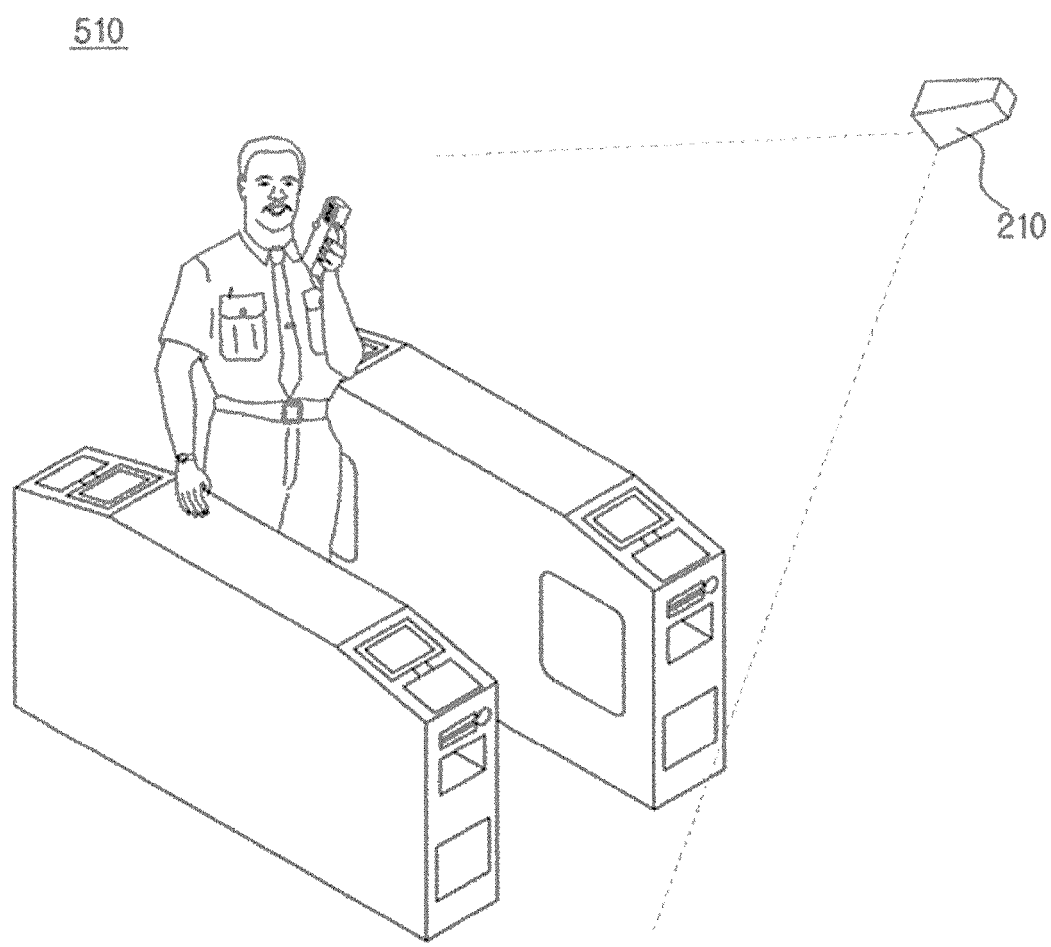

[FIG. 6]
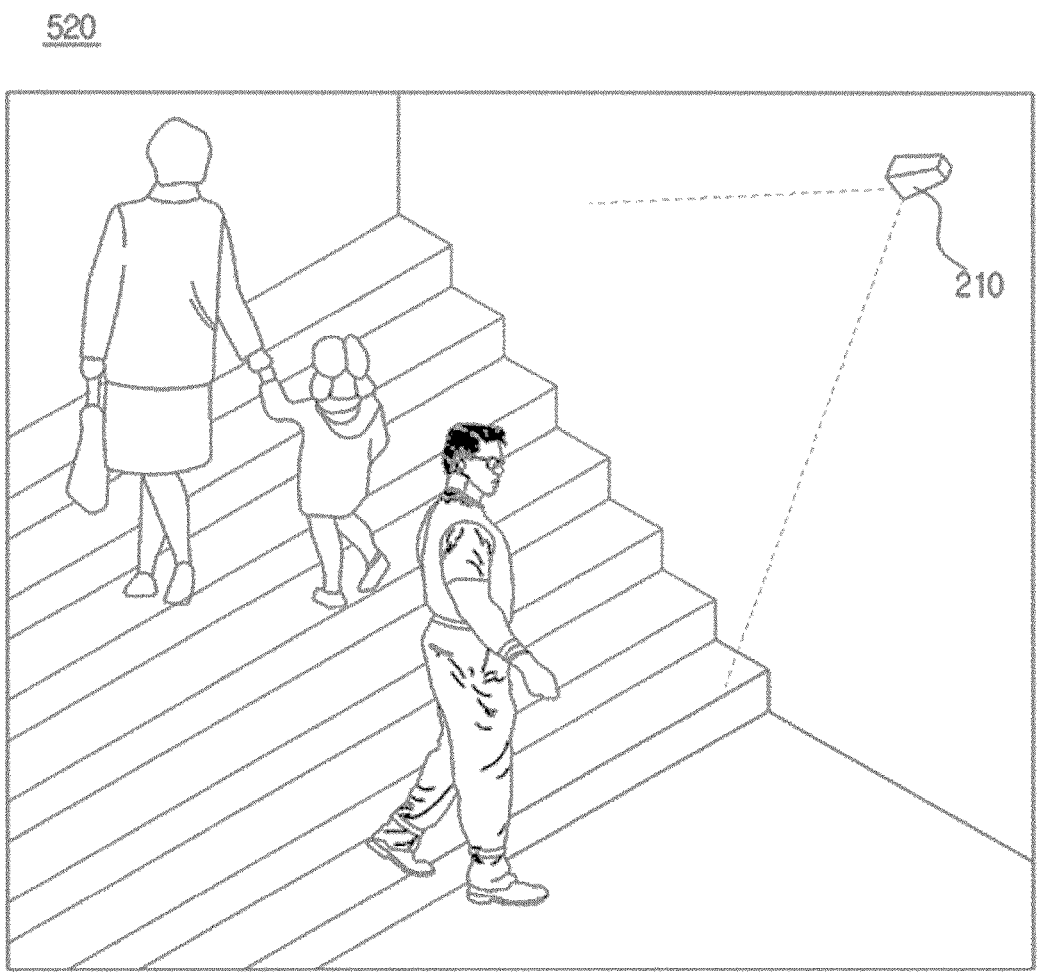

[FIG. 7]
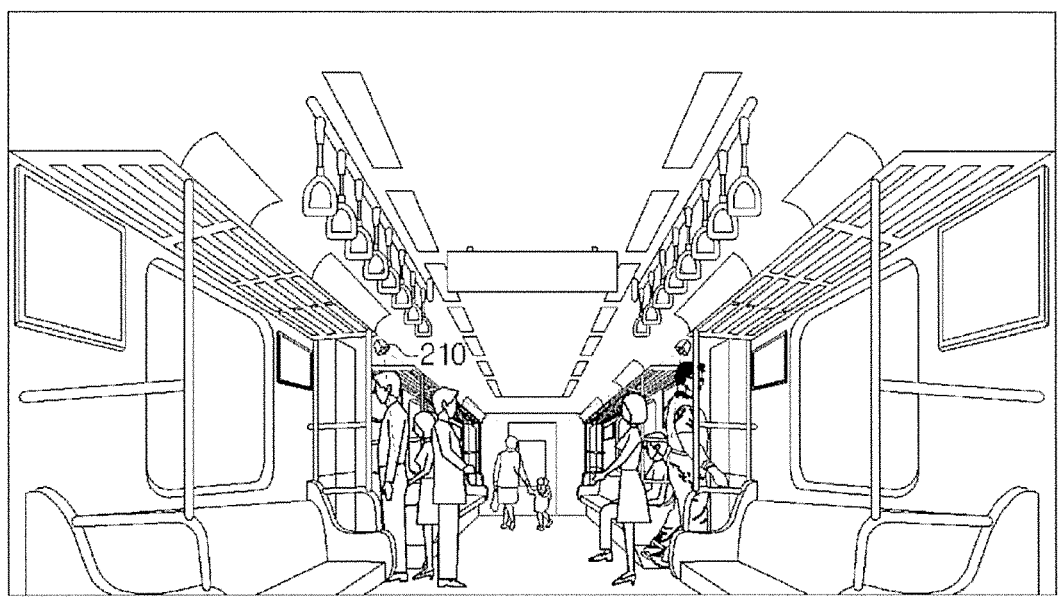

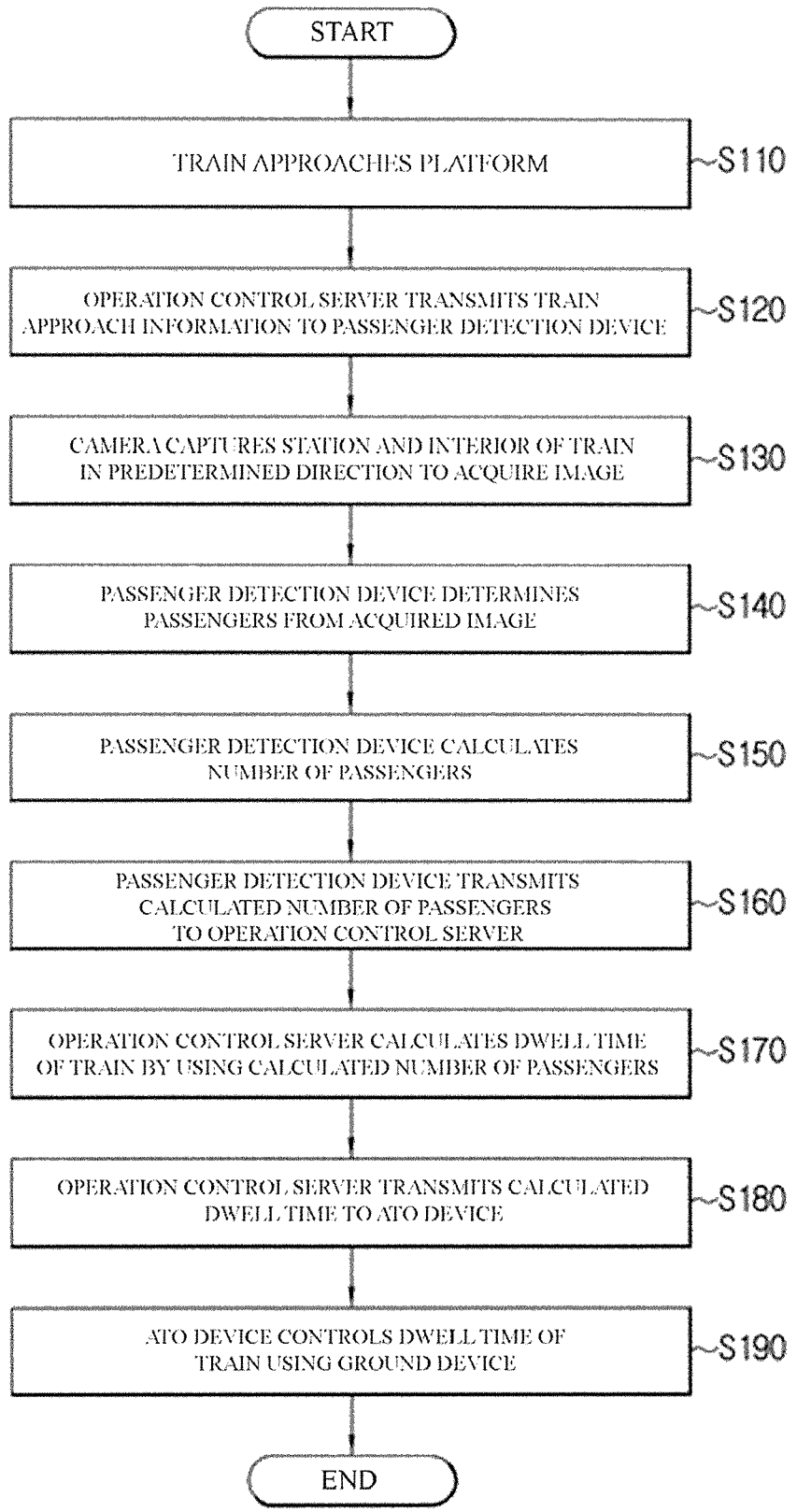
[FIG. 8]

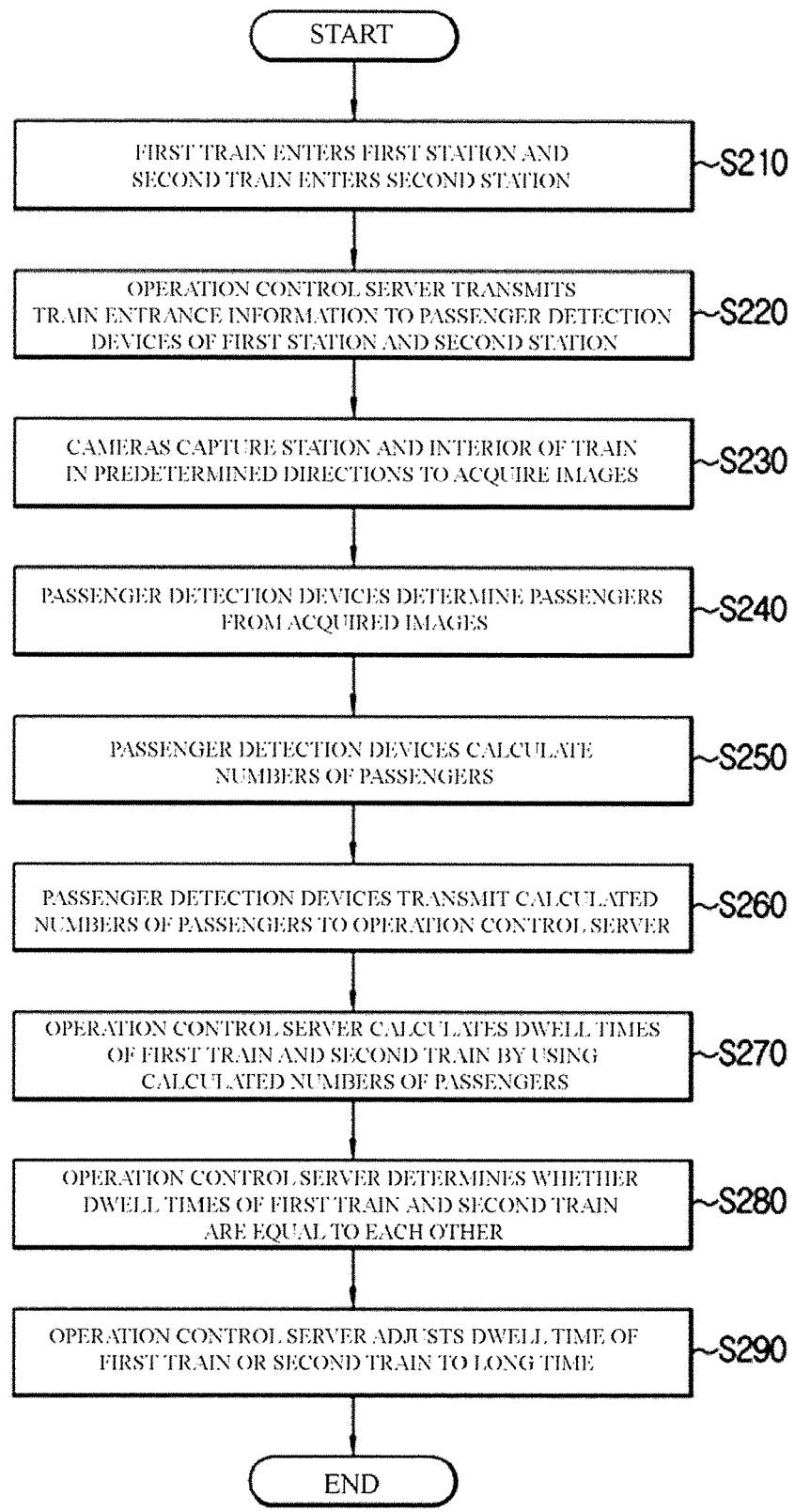
[FIG. 9]

SERVER, SYSTEM, AND METHOD FOR AUTOMATICALLY CALCULATING PLATFORM DWELL TIME OF TRAIN

CROSS-REFERENCE TO RELATED APPLICATION

This application is a 371 of international application of PCT application serial no. PCT/KR2015/014063, filed on Dec. 22, 2015, which claims the priority benefit of Korean application no. 10-2015-0056296, filed on Apr. 22, 2015. The entirety of each of the above-mentioned patent applications is hereby incorporated by reference herein and made a part of this specification.

TECHNICAL FIELD

The present invention relates to a system and method for automatically calculating a platform dwell time of a train, and more particularly, to a system and method for automatically calculating a platform dwell time of a train, the system and method being capable of discovering the number of passengers who are waiting to board a train at a station and the number of passengers who will deboard the train by using an image obtained through a camera when the train approaches the platform and capable of adjusting a dwell time of the train according to the discovered numbers of passengers.

BACKGROUND ART

Generally, when trains such as a national railway train, an underground railway train, and a subway railway train arrive on a platform of a station, the trains open platform screen doors (PSDs), stay for a predetermined time, and then close the PSDs and depart from the station. In this case, a time for which the train stays on the platform of the station to adjust a boarding and deboarding time of passengers and an operation time of the train at the station is referred to as a dwell time, and the dwell time has an important role for a train operation schedule.

Generally, a train operation management system sends dwell times contained in a train operation schedule to an automatic train operating (hereinafter referred to as an ATO) system, which automatically opens train doors and automatically controls train operation, and the ATO system manages vehicle dwell times by using the dwell times contained in the train operation schedule.

However, all stations cannot have the same dwell time, and even the same station cannot always have the same dwell time. This is because a station with a large floating population such as a transfer station necessarily has a long dwell time and also the dwell time increases with an increase of a floating population during commute times.

That is, a dwell time should be managed in consideration of a change in a floating population for the purpose of safety of passengers. When many passengers are present on a platform and many passengers board and deboard a train, a driver of the train manually decides a dwell time and a departure time of the train.

However, when a train is operated without a driver, there is no driver decision such as that described above, and the train opens and closes its doors and then departs according to a predetermined dwell time. Thus, safety of passengers is not guaranteed.

Accordingly, there is a need for an ATO system that determines a dwell time and a departure of a train according to the number of passengers who are located on a platform and the number of passengers who board the train.

SUMMARY OF THE INVENTION

Technical Problem

The present invention is designed to solve the above-described problems and is intended to provide a user with an automatic train operating (ATO) system, server, and method that analyze the number of passengers who are present on a platform to control a boarding time.

Also, the present invention is also intended to provide a user with an ATO system, server, and method that manage a dwell time at each station and control a train interval at a control center.

Technical problems intended to be solved by the invention are not limited to the aforementioned problems, and other technical problems that are not described herein should be clearly understood by those skilled in the art from the following description.

Technical Solution

According to an aspect of the present invention, there is provided a system for automatically calculating a dwell time of a train, the system including a passenger detection device configured to determine the number of passengers who board or deboard a train entering a station; an operation control server configured to calculate an appropriate dwell time of the train by using the number of passengers received from the passenger detection device; and an automatic train operating (ATO) device configured to control a dwell time of the train by using the appropriate dwell time received from the operation control server.

Also, the system may further include a camera configured to capture the station or at least a portion of the station in a predetermined direction to generate an image thereof, wherein the passenger detection device may analyze the image generated by the camera to calculate the number of passengers.

Also, the camera may capture an area including at least one of a ticket gate, platform stairs, a platform passage, and a train door.

Also, a first camera may include a plurality of first cameras installed a predetermined distance apart from each other and configured to capture at least some portions of the station in predetermined directions to generate first images thereof. The passenger detection device may merge the generated first images and analyze the merged first images to calculate the number of passengers.

Also, the camera may include a first camera configured to capture at least a portion of the station to generate a first image and a second camera configured to capture at least a portion of the train to generate a second image. The passenger detection device may analyze the first image and the second image to calculate the number of passengers who board the train and the number of passengers who deboard the train. The operation control server may use the number of passengers who board the train and the number of passengers who deboard the train to calculate the appropriate dwell time of the train.

Also, the second camera may include a plurality of second cameras installed above doors of the train and configured to capture an interior of the train in predetermined directions to generate second images, and the passenger detection device may extract passengers from the generated second images and calculate the number of passengers who deboard the train at the station by using face directions of the extracted passengers.

Also, the passenger detection device may measure the number of heads of passengers in the first image and the second image to calculate the number of passengers.

Also, the camera may capture at least a portion of the platform to generate an image thereof. The passenger detection device may measure an area of the platform in the image and calculate a passenger density of the platform by using the area of the platform and the number of passengers. The operation control server may calculate the appropriate dwell time by using the calculated passenger density.

Also, the passenger detection device may determine the number of passengers who are present in the station when the train enters the station.

Also, the passenger detection device may receive information on a time at which the train enters the station from the operation control server.

Also, the ATO device may compare the appropriate dwell time received from the operation control server with a boarding and deboarding time of the passengers and transmit the boarding and deboarding time of the passengers to the operation control server when the appropriate dwell time is not equal to the boarding and deboarding time of the passengers. The operation control server may compile statistics of the transmitted boarding and deboarding time of the passengers and the determined number of passengers, store the statistics in a database, generate a formula for a correlation therebetween, and calculate the appropriate dwell time of the train by using the formula for the correlation.

Also, the passenger detection device may use at least one of a capturing device, a proximity detection sensor, a displacement detection sensor, a rotation detection sensor, a speed detection sensor, a vibration detection sensor, a weight detection sensor, a visible light sensor, an infrared sensor, an ultraviolet ray sensor, an image sensor, an electromagnetic wave sensor, a thermal sensor, and an ultrasonic sensor to determine the number of passengers.

According to another aspect of the present invention, there is provided a method of automatically calculating a dwell time of a train, the method including entering, by a train, a station; transmitting, by an operation control server, information on a time at which the train enters the station to a passenger detection device; capturing, by a first camera, at least a portion of the station in a predetermined direction to acquire a first image; capturing, by a second camera, an interior of the train in a predetermined direction to acquire a second image; determining, by the passenger detection device, passengers from the first image and the second image; calculating, by the passenger detection device, the number of passengers; transmitting, by the passenger detection device, the calculated number of passengers to the operation control server; calculating, by the operation control server, an appropriate dwell time of the train by using the calculated number of passengers; transmitting, by the operation control server, the appropriate dwell time to an ATO device; and controlling, by the ATO device, a dwell time of the train by using a ground device.

Also, the at least a portion of the station may include a ticket gate, platform stairs, a platform, and a platform passage.

Also, the first camera may include a plurality of first cameras installed a predetermined distance apart from each other and configured to capture at least some portions of the station in predetermined directions to acquire first images, and the determining, by the passenger detection device, of passengers from the first image and the second image may include merging the acquired first images.

Also, the plurality of first cameras may capture the at least some portions of the station such that the acquired first images partially overlap each other, and the merging of the acquired first images may include merging the first images so that the overlapping portions of the acquired first images match each other.

Also, the second camera may include a plurality of second cameras installed above doors of the train and configured to capture the interior of the train in predetermined directions to generate second images. The determining, by the passenger detection device, of passengers from the first image and the second image may include extracting passengers from the generated second images and calculating the number of passengers who deboard the train at the station by using face directions of the extracted passengers.

According to another aspect of the present invention, there is provided a recording medium readable by a digital processing device in which a program of instructions executable by the digital processing device is implemented to perform a method of automatically calculating a dwell time of a train, the instructions including functions of entering, by a train, a platform; transmitting, by an operation control server, information on a titre at which the train enters the station to a passenger detection device; capturing, by a first camera, at least a portion of the station in a predetermined direction to acquire a first image; capturing, by a second camera, an interior of the train in a predetermined direction to acquire a second image; determining, by the passenger detection device, passengers from the first image and the second image; calculating, by the passenger detection device, the number of passengers; transmitting, by the passenger detection device, the calculated number of passengers to the operation control server; calculating, by the operation control server, an appropriate dwell time of the train by using the calculated number of passengers; transmitting, by the operation control server, the appropriate dwell time to an ATO device; and controlling, by the ATO device, a dwell time of the train by using a ground device.

According to another aspect of the present invention, there is provided a system for automatically calculating a dwell time of a train, the system including a passenger detection device configured to determine the number of passengers who are present in a station; an operation control server configured to calculate an appropriate dwell time of the train by using the number of passengers which is received from the passenger detection device, and an ATO device configured to control a dwell time of the train by using the appropriate dwell time which is received from the operation control server, wherein a first train may enter a first station, a second train may enter a second station, and the operation control server may calculate a first appropriate dwell time of the first train and a second appropriate dwell time of the second train, adjust the second appropriate dwell time to be equal to the first appropriate dwell time when the first appropriate dwell time is longer than the second appropriate dwell time, and maintain an interval between the first train and the second train at a constant value.

According to another aspect of the present invention, there is provided a method of automatically calculating a dwell time of a train, the method including entering, by a first train, a first station and entering, by a second train, a second station; transmitting, by an operation control server, information on a time at which the first train enters the first station and a time at which the second station enters the second station to passenger detection devices of the first station and the second station; capturing, by a camera of the first station and a camera of the second station, at least a portion of the first station and at least a portion of the second station in predetermined directions to acquire a first image and a second image, respectively; capturing, by a camera installed inside the first train and a camera installed inside the second train, an interior of the first train and an interior of the second train in predetermined directions to acquire a third image and a fourth image, respectively; determining, by the passenger detection device of the first station, passengers from the first image and the third image; determining, by the passenger detection device of the second station, passengers from the second image and the fourth image; calculating, by the passenger detection devices of the first station and the second station, the numbers of passengers; transmitting, by the passenger detection devices of the first station and the second station, the calculated numbers of passengers to the operation control server; calculating, by the operation control server, an appropriate dwell time of the first train and an appropriate dwell time of the second train using the calculated numbers of passengers; determining, by the operation control server, whether the appropriate dwell time of the first train is equal to the appropriate dwell time of the second train; and adjusting, by the operation control server, the second appropriate dwell time to be equal to the first appropriate dwell time.

According to another aspect of the present invention, there is provided a recording medium readable by a digital processing device in which a program of instructions executable by the digital processing device is implemented to perform a method of automatically calculating a dwell time of a train, the instructions including functions of entering, by a first train, a first station and entering, by a second train, a second station; transmitting, by an operation control server, information on a time at which the first enters the first station and a time at which the second station enters the second station to passenger detection devices of the first station and the second station; capturing, by a camera of the first station and a camera of the second station, at least a portion of the first station and at least a portion of the second station in predetermined directions to acquire a first image and a second image, respectively; capturing, by a camera installed inside the first train and a camera installed inside the second train, an interior of the first train and an interior of the second train in predetermined directions to acquire a third image and a fourth image, respectively; determining, by the passenger detection device of the first station, passengers from the first image and the third image; determining, by the passenger detection device of the second station, passengers from the second image and the fourth image; calculating, by the passenger detection devices of the first station and the second station, the numbers of passengers; transmitting, by the passenger detection devices of the first station and the second station, the calculated numbers of passengers to the operation control server; calculating, by the operation control server, an appropriate dwell time of the first train and an appropriate dwell time of the second train using the calculated numbers of passengers; determining, by the operation control server, whether the appropriate dwell time of the first train is equal to the appropriate dwell time of the second train; and adjusting, by the operation control server, the second appropriate dwell time to be equal to the first appropriate dwell time.

According to another aspect of the present invention, there is provided an operation control server for automatically calculating a dwell time of a train, the operation control server including functions of receiving the number of passengers calculated by a passenger detection device; calculating an appropriate dwell time of a train by using the number of passengers; and transmitting the appropriate dwell time to an ATO device that controls a dwell time of the train based on the appropriate dwell time.

Also, the number of passengers may be calculated by analyzing an image of at least a portion of a station or an image of an interior of the train, which is received from the passenger detection device.

Also, the number of passengers may be calculated by merging and analyzing a plurality of images received from a plurality of passenger detection devices installed a predetermined distance apart from each other.

Also, the appropriate dwell time may be calculated by using a passenger density of a platform calculated by using the number of passengers and an area of the platform, which are received from the passenger detection device.

Also, the operation control server may further include functions of transmitting information on a time at which the train approaches a platform to the passenger detection device; and receiving the number of passengers from the passenger detection device according to the information on the time at which the train approaches the platform.

Advantageous Effects of the Invention

The present invention may provide a user with an automatic train operating (ATO) system, server, and method that analyze the number of passengers who are present on a platform to adjust a boarding time.

The present invention may also provide a user with an ATO system and method that manage a dwell time at each station and control a train interval at a control center.

The present invention may also ensure safety of passengers by managing a dwell time of a train at each station.

Advantageous effects of the invention are not limited to the aforementioned effects, and other advantageous effects that are not described herein should be clearly understood by those skilled in the art from the following description.

DESCRIPTION OF THE DRAWINGS

Since the following figures attached to this specification are intended to illustrate preferred embodiments of the present invention and assist in further understanding the technical spirit of the invention together with the detailed description of the invention, the present invention is not to be construed as being limited to only the following figures.

FIG. 1 shows a conventional train operation management system.

FIG. 2 shows an example of a block diagram of a train operation management system according to the present invention.

FIGS. 3A to 3D show examples of installation of a platform surveillance camera located in a station according to the present invention.

FIG. 4 shows an example of a platform at which a surveillance camera is installed according to the present invention.

FIG. 5 shows an example of a ticket gate at which a surveillance camera is installed according to the present invention.

FIG. 6 shows an example of platform stairs at which a surveillance camera is installed according to the present invention.

FIG. 7 shows an example of an interior of a train in which a surveillance camera is installed according to the present invention.

FIG. 8 is a flowchart of a train operation management method according to the present invention.

FIG. 9 is a flowchart of a train operation management method according to another embodiment of the present invention.

DETAILED DESCRIPTION OF THE INVENTION

A train operation management system refers to a system for generally managing operation of a train to safely and stably operate the train.

An automatic train operating (ATO) system is a train operation management system for automatically opening or closing a train door and automatically controlling operation of a train. The ATO operates to control operation of a train according to a scheduled dwell time of the train.

As shown in FIG. 1, a conventional ATO device receives a dwell time of a train from an operation control server and controls operation of the train by using the received dwell time.

However, a method of using a conventional ATO device to control operation of a train has problems in that operation of a train is managed according to a dwell time that is collectively sent by an operation control server, there is no consideration of the number of passengers who board the train, the number of passengers who deboard the train, and a floating population, and manual conversion is performed for safety of passengers.

When a train is operated without a driver, there is a problem in that safety of passengers is not guaranteed. Accordingly, there is a need for an ATO system that automatically determines a dwell time according the number of passengers who are located on a platform and the number of passengers who board a train, and determines a departure of the train.

The present invention is designed to solve the above problems and may guarantee safety of passengers by capturing an image of passengers who are present in a station and who are present in a train approaching a platform through a camera, determining the number of passengers from the captured image, calculating an appropriate dwell time needed for passenger safety on the basis of the determined number of passengers, and delivering the dwell time to an ATO system.

A preferred embodiment of the present invention will be described below with reference to the accompanying drawings. Also, the embodiment to be described below does not limit the scope of the present invention defined in the claims, and the configuration described in this embodiment is not entirely essential for the technical solution of the present invention.

<Configuration>

FIG. 2 shows an example of a block diagram of a train operation management system according to the present invention.

When reviewing an embodiment of the present invention with reference to FIG. 2, a train operation management system of the present invention may include an operation control server 100, a plurality of station management systems 200, an integrated station network 300, and an ATS network 400.

In this case, each of the plurality of station management system 200 may include a camera 210, a passenger detection device 220, an ATO device 230, and a ground device 240.

When reviewing elements in detail, the operation control server 100 may collect information regarding operation of a train, manage the collected information in a database, and control overall operations of the train.

Also, the operation control server 100 may manage a train operation schedule and a passenger occupation rate and weight of each station as a database.

Also, the operation control server 100 may manage the number of passengers for each time period in each station, a train boarding and deboarding time, a calculated appropriate dwell time, and an actual dwell time as a database.

In addition, when the calculated appropriate dwell time is different from a train boarding and deboarding tune of the passengers, the operation control server 100 may store the different times in the database and compile statistics of a correlation between the train boarding and deboarding time stored in the database and the determined number of passengers. Also, the operation control server 100 may use the correlation to calculate the appropriate dwell time of the train.

Also, the operation control server 100 may control the overall operations of the train, such as an operating speed of the train, an interval adjustment of the train, and an operating status of the train.

In particular, the operation control server 100 may calculate an appropriate dwell time for each station from a passenger density, and may transmit the appropriate dwell time to each of the stations.

The station management system 200 may further include the camera 210, the passenger detection device 220, the ATO device 230, and the ground device 240 in order to check the number of passengers for each station.

Installation of the camera 210 will be described with reference to FIGS. 3 to 7.

FIGS. 3A to 3D show examples of installation of a platform surveillance camera located in a station according to the present invention, FIG. 4 shows an example of a platform at which a surveillance camera is installed according to the present invention, FIG. 5 shows an example of a ticket gate at which a surveillance camera is installed according to the present invention, FIG. 6 shows an example of platform stairs at which a surveillance camera is installed according to the present invention, and FIG. 7 shows an example of an interior of a train in which a surveillance camera is installed according to the present invention.

The camera 210 generates image data such as a still image or video obtained by an image sensor in a capturing mode. Processed image data may be stored in a memory or a database.

Referring to FIGS. 3A to 3D, the camera 210 may be located at a portion of a ceiling of a platform 500 of a station.

Also, referring to FIG. 4, a plurality of cameras 210 are located on the platform 500 to capture respective predetermined areas. In this case, the number of cameras 210 equal to the number of train cars may be installed.

Also, referring to FIGS. 5 and 6, the camera 210 may capture a ticket gate 510 of a station and may also capture platform stairs 520 located in a station.

Also, referring to FIG. 7, the camera 210 may capture an interior of a train 1000 approaching a platform. In this case, it is preferable that the camera 210 be located above a door of the train 1000.

The plurality of cameras 210 may capture images such that the images partially overlap each other.

The images captured by the cameras 210 may be transmitted to the passenger detection device 220.

The passenger detection device 220 may determine the number of passengers on the platform 500 from the images captured by the cameras 210.

That is, the passenger detection device 220 may perform shape analysis on the images captured by the cameras 210, determine passengers, and calculate the number of passengers.

In this case, the passenger detection device 220 may generally calculate the number of passengers on the basis of head shapes, face shapes, or the like of the passengers.

Also, the passenger detection device 220 may determine whether a passenger deboards the train 1000 using a face direction of the passenger on the basis of a face shape and a hair shape of the passenger, and may calculate the number of passengers that deboard the train 1000.

When the plurality of cameras 210 are provided, the passenger detection device 220 may collect images obtained by the plurality of cameras 210 and calculate the total number of passengers on the platform 500.

When the images captured by the plurality of cameras 210 partially overlap each other, the passenger detection device 220 may determine an overlapping image portion and accurately calculate the number of passengers through a method of combining corresponding images.

That is, the passenger detection device 220 may acquire and analyze an image of a passenger through a capturing device, and also may consider using the number of repetitions of an object that approaches a specific position or the current number of identifications of objects.

Also, a method of using the number of occurrences of rotation and displacement of a moving object through a displacement detection sensor or a rotation detection sensor installed at a ticket gate or platform stairs may be considered. Also, a method of determining the number of passengers by utilizing a speed detection sensor, a vibration detection sensor, a visible light sensor, an infrared sensor, an ultraviolet-ray sensor, an electromagnetic wave sensor, a thermal sensor, or an ultrasonic sensor in a similar way may be considered.

Furthermore, a method of determining the number of passengers on the basis of weights of passengers by utilizing a weight detection sensor may be considered.

The ATO device 230 may control operation of a train using received train operation information.

The operation control for the train may include a train speed, a train dwell time, a train door control, and a train departure control.

The ground device 240 is a device for controlling operation of a train according to the control of the ATO device 230.

The ground device 240 may control a stop of a train, a departure of a train, and an opening or closing of a train door.

The integrated station network 300 is a network that is installed at each station and is configured to exchange signals in order to control operation of a train.

The integrated station network 300 may connect the camera 210, the passenger detection device 220, the ATO device 230, and the ground device 240 to each other to enable signals to be exchanged therebetween.

Also, the integrated station network 300 may connect stations to one another to enable signals to be exchanged therebetween.

The integrated station network 300 may include the ATS network 400.

The ATS network 400 is a network configured to exchange signals among the operation control server 100, the passenger detection device 220, and the ground device 240.

In order to distinguish the ATS network 400 from the integrated station network 300, the ATS network 400 may be configured as a separate network.

A system for automatically calculating a platform dwell time of a train and controlling the train may be configured as described above.

<Actions>

A method of automatically calculating a platform dwell time of a train will be described below with reference to the accompanying drawings.

FIG. 8 is a flowchart of a train operation management method according to the present invention.

Referring to FIG. 8, automatic calculation of a platform dwell time of a train is started when the train approaches the platform 500 (S110).

When the train approaches the platform 500, the operation control server 100 transmits information on the approach of the train to the passenger detection device 220 (S120). In this case, the operation control server 100 transmits approach time information of the train to the passenger detection device 220 over an ATS network.

When the passenger detection device 220 receives the approach time information of the train, the passenger detection device 220 transmits a signal to enable the camera 210 to capture the platform 500, the ticket gate 510, and the platform stairs 520, which are located in a station, and the inside of the train 1000, which is entering the station in a predetermined direction to acquire images thereof. Then, the camera 210 acquires the images by capturing each of the platform 500, the ticket gate 510, and the platform stairs 520, which are located in the station, and the inside of the train 1000, which is entering the station in the predetermined direction (S130).

When the camera 210 acquires the images, the passenger detection device 220 determines passengers from the acquired images (S140). The passenger detection device 220 may generally determine the number of passengers and directions in which the passengers are moving on the basis of head shapes, face shapes, or the like of the passengers to calculate the number of passengers.

After determining the passengers from the image, the passenger detection device 220 calculates the number of passengers (S150). In this case, the passenger detection device 220 performs shape analysis on the images, determines passengers entering the platform, passengers boarding the train, and passengers deboarding the train, and calculates the numbers of passengers. When the plurality of cameras 210 are provided, the passenger detection device 220 may collect images obtained through the plurality of cameras 210 and calculate the total number of passengers on the platform 500. When the images captured by the plurality of cameras 210 partially overlap each other, the passenger detection device 220 may determine an overlapping image portion and accurately calculate the number of passengers through a method of combining corresponding images.

After the number of passengers is determined, the passenger detection device 220 transmits the calculated number of passengers to the operation control server 100 (S160). In this case, the passenger detection device 220 uses the ATS network to carry out the transmission.

After the calculated number of passengers is transmitted to the operation control server 100, the operation control server 100 calculates an appropriate dwell time of the train using the calculated number of passengers (S170). In this case, the operation control server 100 automatically calculates the appropriate dwell time of the train 1000 arriving at a corresponding station by using the numbers of passengers who board and deboard the train 1000, train dwell time information matching thereto, and a ratio of the number of passengers present on the platform 500 to an area of the platform 500, which is predetermined and built as a database.

After the appropriate dwell time of the train is calculated by the operation control server 100, the operation control server 100 performs a step of transmitting the calculated appropriate dwell time to the ATO device 230 (S180). In this case, the ATS network is used to transmit the dwell time to the ATO device 230.

When the calculated appropriate dwell time is transmitted to the ATO device 230, the ATO device 230 controls the dwell time of the train using the ground device 240 (S190). That is, the ATO device 230 may control opening or closing of doors of the train and a departure of the train using the ground device 240.

<Train Interval Maintenance>

A method of maintaining a train interval by using the method of automatically calculating a platform dwell time of a train will be described below with reference to the accompanying drawings.

FIG. 9 is a flowchart of a train operation management method according to another example of the present invention.

Referring to FIG. 9, the method of maintaining a train interval by using the method of automatically calculating a platform dwell time of a train starts with a first train entering a first station and a second train entering a second station (S210).

When the first train enters the first station and the second train enters the second station, an operation control server transmits train entrance time information to passenger detection devices of the first station and the second station (S220). In this case, the operation control server 100 transmits the train entrance time information to the passenger detection devices over an ATS network.

When the passenger detection devices 220 of the first station and the second station receive the train entrance time information, each of the passenger detection devices 220 transmits a signal to enable the camera 210 to capture the platform 500, the ticket gate 510, and the platform stairs 520, which are located in each of the stations, and the inside of the train 1000, which is entering each of the stations in a predetermined direction, to acquire images thereof. Then, the camera 210 acquires the images by capturing the platform 500, the ticket gate 510, and the platform stairs 520, which are located in the station, and the inside of the train 1000, which is entering the station in the predetermined direction (S230).

When the camera 210 acquires the images, the passenger detection devices 220 of the first station and the second station determine passengers from the acquired images (S240). The passenger detection devices 220 may generally determine the number of passengers and directions in which the passengers are moving on the basis of head shapes, face shapes, or the like of the passengers in order to calculate the number of passengers.

After determining the passengers from the images, the passenger detection devices 220 of the first station and the second station calculate the number of passengers (S250). In this case, the passenger detection devices 220 perform shape analysis on the images, determine passengers entering the platform, passengers boarding the train, and passengers deboarding the train, and calculate the numbers of passengers. When the plurality of cameras 210 are provided, the passenger detection devices 220 may collect images obtained through the plurality of cameras 210 and calculate the total numbers of passengers in the platforms 500. When the images captured by the plurality of cameras 210 partially overlap each other, the passenger detection devices 220 may determine an overlapping image portion and accurately calculate the numbers of passengers through a method of combining corresponding images.

After the number of passengers is determined, the passenger detection devices 220 of the first station and the second station transmit the calculated number of passengers to the operation control server 100 (S260). In this case, the passenger detection devices 220 use the ATS network to carry out the transmission.

After the calculated numbers of passengers are transmitted to the operation control server 100, the operation control server 100 calculates appropriate dwell times of the first train and the second train using the calculated numbers of passengers (S270). In this case, the operation control server 100 automatically calculates the appropriate dwell times of the trains arriving at corresponding stations by using the numbers of passengers who board and deboard the trains 1000, train dwell time information matching thereto, and ratios of the numbers of passengers present on the platforms 500 to areas of the platforms 500.

When the appropriate dwell times of the first train and the second train are calculated, the operation control server 100 determines whether the appropriate dwell times of the first train and the second train are the same (S280). Whether the dwell times are the same is determined in order to maintain a train interval.

When whether the appropriate dwell times of the first train and the second train are the same is determined, the operation control server adjusts the appropriate dwell time of the first train or the appropriate dwell time of the second train to a long time (S290). In order to ensure time enough for the passengers to board the trains for the purpose of safety of the passengers, the appropriate dwell time is adjusted to a long time.

Through the above method, a train interval may be adjusted to a constant value.

According to the above method, it is possible to automatically calculate an appropriate dwell time of a train, sufficiently ensure an appropriate dwell time of a train commensurate with the number of passengers, and prevent an accident that may occur during the boarding or deboarding of passengers. In particular, the method may be an essential function for a train that is operated without a driver.

It is also possible to pre-calculate and adjust an appropriate dwell time of a train to maintain a train interval at a certain value.

Furthermore, when passengers continue to board and deboard a train even after an appropriate dwell time of the train calculated according to passenger density elapses, it is also possible to automatically extend the train dwell time. Thus, when departure of the train is delayed for a certain amount of time, an operation control center of the train may determine this situation and manually control doors of the train.

The method of automatically calculating a platform dwell time of a train according to the present invention may be programmed and stored in a computer-readable recording medium such as a CD-ROM, a memory, a ROM, and an electrically erasable programmable read-only memory (EEPROM).

While the preferred embodiments of the present invention have been described, the present invention is not limited thereto, and it should be understood by those skilled in the art that various substitutions, modifications, and changes may be made without departing from the scope and spirit of the present invention.

What is claim is:

1. A method of automatically calculating a dwell time of a train, the method comprising:
   entering, by a train, a station;
   transmitting, by an operation control server, information on a time at which the train enters the station to a passenger detection device;
   capturing, by a first camera, at least a portion of the station in a predetermined direction to acquire a first image;
   capturing, by a second camera, an interior of the train in a predetermined direction to acquire a second image;
   determining, by the passenger detection device, passengers from the first image and the second image;
   calculating, by the passenger detection device, the number of passengers;
   transmitting, by the passenger detection device, the calculated number of passengers to the operation control server;
   calculating, by the operation control server, an appropriate dwell time of the train by using the calculated number of passengers;
   transmitting, by the operation control server, the appropriate dwell time to an ATO device; and
   controlling, by the ATO device, a dwell time of the train by using a ground device.

2. The method of claim 1, wherein the at least a portion of the station includes a ticket gate, platform stairs, a platform, and a platform passage.

3. The method of claim 1, wherein:
   the first camera includes a plurality of first cameras installed a predetermined distance apart from each other and configured to capture at least some portions of the station in predetermined directions to acquire first images; and
   the determining, by the passenger detection device, of passengers from the first image and the second image comprises merging the acquired first images.

4. The method of claim 3, wherein:
   the plurality of first cameras capture the at least some portions of the station such that the acquired first images partially overlap each other; and
   the merging of the acquired first images comprises merging the first images so that the overlapping portions of the acquired first images match each other.

5. The method of claim 1, wherein:
   the second camera includes a plurality of second cameras installed above doors of the train and configured to capture the interior of the train in predetermined directions to generate second images; and
   the determining, by the passenger detection device, of passengers from the first image and the second image comprises extracting passengers from the generated second images and calculating the number of passengers who deboard the train at the station by using face directions of the extracted passengers.

6. A non-transitory recording medium readable by a digital processing device in which a program of instructions executable by the digital processing device is implemented to perforin a method of automatically calculating a dwell time of a train, the instructions comprising functions of:
   entering, by a train, a platform;
   transmitting, by an operation control server, information on a time at which the train enters the station to a passenger detection device;
   capturing, by a first camera, at least a portion of the station in a predetermined direction to acquire a first image;
   capturing, by a second camera, an interior of the train in a predetermined direction to acquire a second image;
   determining, by the passenger detection device, passengers from the first image and the second image;
   calculating, by the passenger detection device, the number of passengers;
   transmitting, by the passenger detection device, the calculated number of passengers to the operation control server;
   calculating, by the operation control server, an appropriate dwell time of the train by using the calculated number of passengers;
   transmitting, by the operation control server, the appropriate dwell time to an ATO device; and
   controlling, by the ATO device, a dwell time of the train by using a ground device.

7. A system for automatically calculating a dwell time of a train, the system comprising:
   a passenger detection device configured to determine the number of passengers who are present in a station and the number of passengers who are present in a train entering the station;
   an operation control server configured to calculate an appropriate dwell time of the train by using the number of passengers which is received from the passenger detection device; and
   an ATO device configured to control a dwell time of the train by using the appropriate dwell time which is received from the operation control server, wherein:
   a first train enters a first station;
   a second train enters a second station; and
   the operation control server calculates a first appropriate dwell time of the first train and a second appropriate dwell time of the second train, adjusts the second appropriate dwell time to be equal to the first appropriate dwell time when the first appropriate dwell time is longer than the second appropriate dwell time, and maintains an interval between the first train and the second train a constant value.

8. A method of automatically calculating a dwell time of a train, the method comprising:
   entering, by a first train, a first station and entering, by a second train, a second station;
   transmitting, by an operation control server, information on a time at which the first train enters the first station and a time at which the second station enters the second station to passenger detection devices of the first station and the second station;
   capturing, by a camera of the first station and a camera of the second station, at least a portion of the first station and at least a portion of the second station in predetermined directions to acquire a first image and a second image, respectively;
   capturing, by a camera installed inside the first train and a camera installed inside the second train, an interior of the first train and an interior of the second train in predetermined directions to acquire a third image and a fourth image, respectively;

determining, by the passenger detection device of the first station, passengers from the first image and the third image;
determining, by the passenger detection device of the second station, passengers from the second image and the fourth image;
calculating, by the passenger detection devices of the first station and the second station, the numbers of passengers;
transmitting, by the passenger detection devices of the first station and the second station, the calculated numbers of passengers to the operation control server;
calculating, by the operation control server, an appropriate dwell time of the first train and an appropriate dwell time of the second train using the calculated numbers of passengers;
determining, by the operation control server, whether the appropriate dwell time of the first train is equal to the appropriate dwell time of the second train; and
adjusting, by the operation control server, the second appropriate dwell time to be equal to the first appropriate dwell time.

9. A non-transitory recording medium readable by a digital processing device in which a program of instructions executable by the digital processing device is implemented to perform a method of automatically calculating a dwell time of a train, the instructions comprising functions of:
entering, by a first train, a first station and entering, by a second train, a second station;
transmitting, by an operation control server, information on a time at which the first train enters the first station and a time at which the second station enters the second station to passenger detection devices of the first station and the second station;
capturing, by a camera of the first station and a camera of the second station, at least a portion of the first station and at least a portion of the second station in predetermined directions to acquire a first image and a second image, respectively;
capturing, by a camera installed inside the first train and a camera installed inside the second train, an interior of the first train and an interior of the second train in predetermined directions to acquire a third image and a fourth image, respectively;
determining, by the passenger detection device of the first station, passengers from the first image and the third image;
determining, by the passenger detection device of the second station, passengers from the second image and the fourth image;
calculating, by the passenger detection devices of the first station and the second station, the numbers of passengers;
transmitting, by the passenger detection devices of the first station and the second station, the calculated numbers of passengers to the operation control server;
calculating, by the operation control server, an appropriate dwell time of the first train and an appropriate dwell time of the second train using the calculated numbers of passengers;
determining, by the operation control server, whether the appropriate dwell time of the first train is equal to the appropriate dwell time of the second train; and
adjusting, by the operation control server, the second appropriate dwell time to be equal to the first appropriate dwell time.

* * * * *